(12) United States Patent
Konstantinides et al.

(10) Patent No.: US 9,973,779 B2
(45) Date of Patent: May 15, 2018

(54) 3D VISUAL DYNAMIC RANGE CODING

(71) Applicant: DOLBY LABORATORIES LICENSING CORPORATION, San Francisco, CA (US)

(72) Inventors: Konstantinos Konstantinides, Saratoga, CA (US); Tyrome Y. Brown, Mountain View, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 356 days.

(21) Appl. No.: 14/378,955

(22) PCT Filed: Mar. 6, 2013

(86) PCT No.: PCT/US2013/029285
§ 371 (c)(1),
(2) Date: Aug. 14, 2014

(87) PCT Pub. No.: WO2013/138127
PCT Pub. Date: Sep. 19, 2013

(65) Prior Publication Data
US 2016/0029044 A1     Jan. 28, 2016

Related U.S. Application Data

(60) Provisional application No. 61/609,542, filed on Mar. 12, 2012.

(51) Int. Cl.
*H04N 19/597* (2014.01)
*H04N 19/30* (2014.01)
(Continued)

(52) U.S. Cl.
CPC ........... *H04N 19/597* (2014.11); *H04N 19/30* (2014.11); *H04N 19/85* (2014.11); *H04N 19/86* (2014.11); *H04N 2213/003* (2013.01)

(58) Field of Classification Search
None
See application file for complete search history.

(56) References Cited

U.S. PATENT DOCUMENTS

| 2009/0285302 A1 | 11/2009 | Kato |
| 2010/0110163 A1 | 5/2010 | Bruls |

(Continued)

FOREIGN PATENT DOCUMENTS

| JP | 2007-243942 | 9/2007 |
| JP | 2009-524371 | 6/2009 |

(Continued)

OTHER PUBLICATIONS

Tourapis, Alexis Michael et al. "A Frame Compatible System for 3D Delivery", MPEG meeting, Jul. 30, 2010, ISO/IEC JTC1/SC29/WG11.

(Continued)

*Primary Examiner* — Kate Luo

(57) ABSTRACT

A sequence of 3D VDR images and 3D SDR images are encoded using a monoscopic SDR base layer and one or more enhancement layers. A first VDR view and a first SDR view are encoded with a DVDL encoder to output first and second coded signals. A predicted 3D VDR signal is generated, which has first and second predicted VDR views. First and second VDR residuals are generated based on their respective VDR views and predicted VDR views. A DVDL encoder encodes the first and second VDR residuals to output third and fourth coded signals. A 3D VDR decoder, which has two DVDL decoders and SDR-to-VDR predictors use the four coded input signals to generate a single-view SDR, 3D SDR, single-view VDR, or 3D VDR signals. A corresponding decoder is also described, which is capable of decoding these encoded 3D VDR and SDR images.

14 Claims, 5 Drawing Sheets

(51) Int. Cl.
*H04N 19/86* (2014.01)
*H04N 19/85* (2014.01)

(56) References Cited

U.S. PATENT DOCUMENTS

| | | | |
|---|---|---|---|
| 2010/0172411 A1* | 7/2010 | Efremov | H04N 19/136 375/240.12 |
| 2011/0194618 A1* | 8/2011 | Gish | G06T 5/50 375/240.25 |
| 2012/0026288 A1 | 2/2012 | Tourapis | |
| 2013/0108183 A1* | 5/2013 | Bruls | G06T 9/004 382/233 |
| 2013/0314495 A1 | 11/2013 | Chen | |
| 2014/0002478 A1 | 1/2014 | Ballestad | |
| 2014/0029675 A1 | 1/2014 | Su | |
| 2014/0043352 A1 | 2/2014 | Damberg | |
| 2014/0086321 A1 | 3/2014 | Efremov | |
| 2014/0105289 A1 | 4/2014 | Su | |
| 2014/0247869 A1 | 9/2014 | Su | |

FOREIGN PATENT DOCUMENTS

| | | |
|---|---|---|
| JP | 2010-507941 | 3/2010 |
| JP | 2014-519221 | 8/2014 |
| JP | 2015-513388 | 5/2015 |
| KR | 10-1058591 | 8/2011 |
| WO | 2010/101420 | 9/2010 |
| WO | 2010/123862 | 10/2010 |
| WO | 2010/123909 | 10/2010 |
| WO | 2011/005624 | 1/2011 |
| WO | 2011/037933 | 3/2011 |
| WO | 2011/084913 | 7/2011 |
| WO | 2011/094034 | 8/2011 |
| WO | 2012/004741 | 1/2012 |
| WO | 2012/006299 | 1/2012 |
| WO | 2012/012584 | 1/2012 |

OTHER PUBLICATIONS

Wu, Y. et al "Bit-Depth Scalability Compatible to H.264/AVC-Scalable Extension" Journal of Visual Communication and Image Representation, Academic Press, vol. 19, No. 6, Aug. 1, 2008, pp. 372-381.

Vetro, A. et al. "3D-TV Content Storage and Transmission" IEEE Transactions on Broadcasting, IEEE Service Center, Piscataway, NJ, US, vol. 57, No. 2, Jun. 1, 2011, pp. 384-394.

* cited by examiner

3D VISUAL DYNAMIC RANGE CODING

CROSS-REFERENCE TO RELATED APPLICATIONS

This application claims priority to U.S. Patent Provisional Application No. 61/609,542, filed 12 Mar. 2012, which is hereby incorporated by reference in its entirety.

TECHNOLOGY

The present invention relates generally to images. More particularly, an embodiment of the present invention relates to layered encoding and decoding of three-dimensional (3D) visual dynamic range (VDR) images.

BACKGROUND 3D video systems garner great interest for enhancing a consumer's experience, whether at the cinema or in the home. These systems use stereoscopic or autostereoscopic methods of presentation, including:

(i) anaglyph—provides left/right eye separation by filtering the light through a two color filter, commonly red for one eye, and cyan for the other eye;

(ii) linear polarization—provides separation at the projector by filtering the left eye through a linear polarizer (commonly) oriented vertically, and filtering the right eye image through a linear polarizer oriented horizontally;

(iii) circular polarization—provides separation at the projector by filtering the left eye image through a (commonly) left handed circular polarizer, and filtering the right eye image through a right handed circular polarizer;

(iv) shutter glasses—provides separation by multiplexing the left and right images in time, and (v) spectral separation—provides separation at the projector by filtering the left and right eye spectrally where the left and right eye each receives a complementary portion of the red, green, and blue spectrums.

Unfortunately, these systems employ stereoscopic image pairs with poor dynamic range that result in a pedestrian illusion of depth—noticeably lacking true realism. Dynamic range (DR) is a range of intensity (e.g., luminance, luma) in an image, e.g., from darkest darks to brightest brights. These stereoscopic image pairs are characterized by approximately three orders of magnitude of dynamic range (e.g., standard dynamic range, SDR), corresponding to the limited rendering capabilities of conventional televisions and computer monitors. This is a humble presentation for some 14 to 15 orders of magnitude of dynamic range (e.g., high dynamic range, HDR) perceptible to a human visual system (with adaptation), or even the 5 to 6 orders of magnitude simultaneously perceptible (e.g., VDR).

Simply increasing dynamic range is often not feasible with bandwidth and storage limitations, particularly for 3D content. A 3D stereoscopic video, with twice the images (e.g., left and right eye perspective images), may already require double the bandwidth and storage over a two-dimensional (2D) video. As appreciated by the inventors here, improved techniques for 3D image processing, given practical bandwidth and storage requirements, are desirable for a superior immersive experience. It is further appreciated that these improved techniques preferably are backwards compatible with single-view SDR systems, single-view VDR systems, and 3D SDR systems.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF THE DRAWINGS

An embodiment of the present invention is illustrated by way of example, and not in way by limitation, in the figures of the accompanying drawings and in which like reference numerals refer to similar elements and in which.

DESCRIPTION OF EXAMPLE EMBODIMENTS

Figure 1:
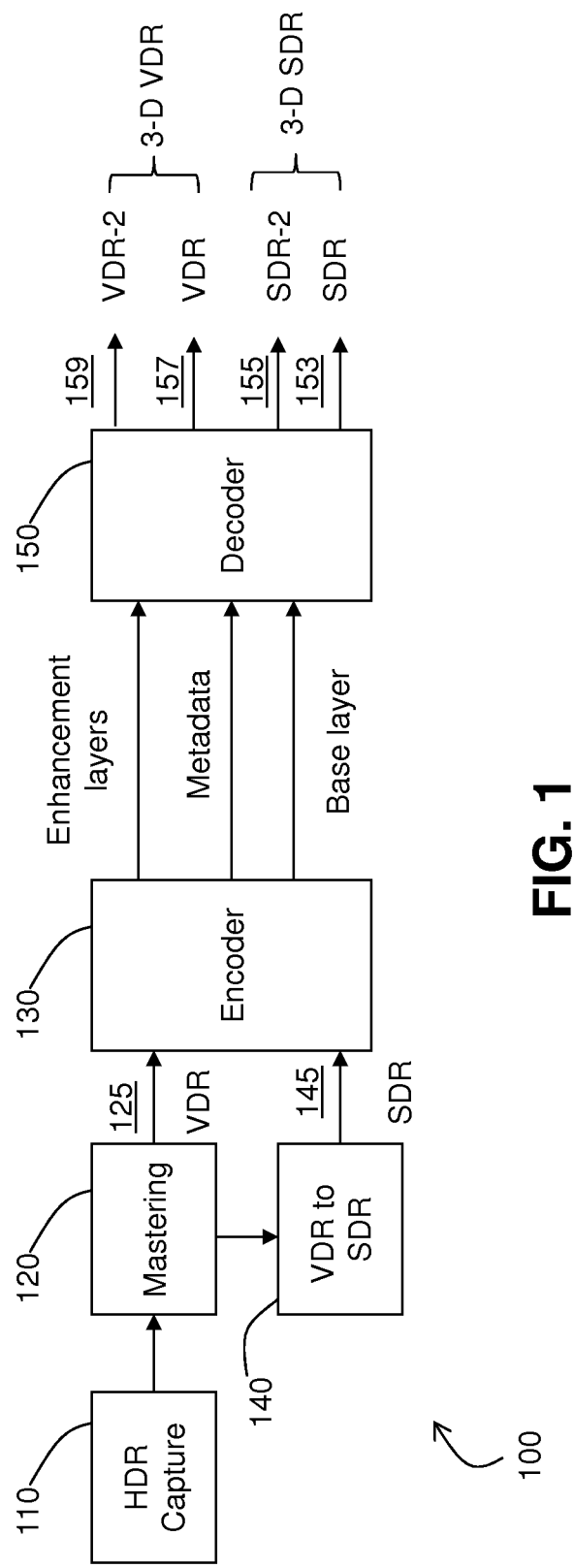
FIG. 1 depicts an example data flow for a VDR-SDR system, according to an embodiment of the present invention.

Layered encoding and decoding of 3D VDR images is described herein. Given a pair of corresponding 3D VDR and SDR images, that is, images that represent the same scene but at different views and at different levels of dynamic range, this specification describes methods that allow an encoder to efficiently encode the 3D video so that decoders can easily extract any of the following signals: single-view SDR, 3D SDR, single-view VDR, or 3D VDR. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily obscuring the present invention.

Overview

Example embodiments described herein relate to layered encoding and decoding of 3D VDR images. A sequence of 3D VDR images and 3D SDR images may be encoded using a monoscopic SDR base layer and one or more enhancement layers. In an encoder, a first VDR view and a first SDR view are encoded using a dual-view-dual-layer (DVDL) encoder to output a first coded signal and a second coded signal. A predicted 3D VDR signal comprising a first predicted VDR view and a second predicted VDR view is generated. A first VDR residual is generated based on the first VDR view and the first predicted VDR view. A second VDR residual is generated based on the second VDR view and the second predicted VDR view. The first VDR residual and the second VDR residual are encoded using a DVDL encoder to output a third coded signal and a fourth coded signal. A 3D VDR decoder comprising two DVDL decoders and SDR to VDR predictors may generate using the four coded input signals a single-view SDR, a 3D SDR, a single-view VDR, or 3D VDR signal.

Notation & Nomenclature

As used herein, the term high dynamic range (HDR) relates to a DR breadth that spans the some 14 to 15 orders of magnitude of the human visual system. For example, well adapted humans with essentially normal (e.g., in one or more of a statistical, physiological, biometric or opthamological sense) have an intensity range that spans about 15 orders of magnitude. Adapted humans may perceive dim light sources of as few as a mere handful of photons. Yet, these same humans may perceive the near painfully brilliant intensity of the noonday sun in desert, sea or snow (or even glance into the sun, however briefly to prevent damage). This span though is available to 'adapted' humans, e.g., those whose visual system has a time period in which to reset and adjust.

In contrast, the DR over which a human may simultaneously perceive an extensive breadth in intensity range may be somewhat truncated, in relation to HDR. As used herein, the terms visual dynamic range or variable dynamic range (VDR) may individually or interchangeably relate to the DR that is simultaneously perceivable by a HVS. As used herein, VDR may relate to a DR that spans 5 to 6 orders of magnitude. Thus while perhaps somewhat narrower in relation to true scene referred HDR, VDR nonetheless represents a wide DR breadth.

As with the scalable video coding and high definition television (HDTV) technologies, extending image DR typically involves a bifurcate approach. For example, scene referred HDR content that is captured with a modern HDR capable camera may be used to generate an SDR version of the content, which may be displayed on conventional SDR displays. In one approach, generating the SDR version from the captured VDR version may involve applying a global tone mapping operator (TMO) to intensity (e.g., luminance, luma) related pixel values in the HDR content. In a second approach, generating an SDR image may involve applying an invertible operator (or predictor) on the VDR data. To conserve bandwidth or for other considerations, transmission of both of the actual captured VDR content and a corresponding SDR version may not be a practical approach.

Thus, an inverse tone mapping operator (iTMO), inverted in relation to the original TMO, or an inverse operator in relation to the original predictor, may be applied to the SDR content version that was generated, which allows a version of the VDR content to be predicted. The predicted VDR content version may be compared to originally captured HDR content. For example, subtracting the predicted VDR version from the original VDR version may generate a residual image. An encoder may send the generated SDR content as a base layer (BL), and package the generated SDR content version, any residual image, and the iTMO or other predictors as an enhancement layer (EL) or as metadata.

Sending the EL and metadata, with its SDR content, residual and predictors, in a bitstream typically consumes less bandwidth than would be consumed in sending both the HDR and SDR contents directly into the bitstream. Compatible decoders that receive the bitstream sent by the encoder may decode and render the SDR on conventional displays. Compatible decoders however may also use the residual image, the iTMO predictors, or the metadata to compute a predicted version of the HDR content therefrom, for use on more capable displays.

Stereoscopic or 3D imaging adds an additional level of complexity to VDR images. Under stereoscopic imaging, each image or video frame is represented by at least two views. For backward compatibility, legacy decoders can decode at least one of the views; however, stereoscopic decoders can reconstruct and display both views. The example 3D VDR video encoding and decoding solutions that are described herein facilitate migration from SDR HDTVs to 3D VDR HDTVs. Example embodiments relate to layered encoding and decoding of 3D VDR images and are described herein, with reference to FIGS. 1-5, inclusive.

Example VDR-SDR System

FIG. 1 depicts an example data flow in a layered VDR-SDR system 100, according to an embodiment of the present invention. A 3D HDR image or video sequence is captured or generated using a 3D HDR camera 110 or other similar means. Following capture, the captured image or video is processed by a mastering process to create a target 3D VDR image 125. The mastering process may incorporate a variety of processing steps, such as: editing, primary and secondary color correction, color transformation, and noise filtering. The VDR output 125 of this process typically represents the director's intent on how the captured image will be displayed on a target VDR display (including, a cinema VDR projection system).

The mastering process may also output a corresponding 3D SDR image 145, representing the director's intent on how the captured image will be displayed on a legacy SDR display. The SDR output 145 may be provided directly from mastering circuit 120 or it may be generated with a separate VDR-to-SDR converter 140.

In this example embodiment, the VDR 125 and SDR 145 signals are inputted into an encoder 130. Purpose of encoder 130 is to create a coded bitstream that reduces the bandwidth required to transmit the VDR and SDR signals, but also allows a corresponding decoder 150 to decode and render either the SDR or VDR signals. In an example embodiment, encoder 130 may be a layered encoder representing its output as a base layer, one or more enhancement layers, and metadata. As used herein, the term "metadata" relates to any auxiliary information that is transmitted as part of the coded bitstream and assists a decoder to render a decoded image. Such metadata may include, but are not limited to, such data as: color space or gamut information, dynamic range information, tone mapping information, or predictor operators, such as those described herein.

On the receiver, a decoder 150 uses the received coded bitstreams and metadata to render either a single-view SDR image 153, a 3D SDR image based on two SDR views (e.g., 153 and 155), a single-view VDR image 157, or a 3D VDR image 159 based on two VDR views (e.g., 157 and 159), according to the capabilities of the target display. For example, a monoscopic SDR display may use only the base layer and the metadata to render a single-view SDR image. In contrast, a 3D VDR display may use information from all input layers and the metadata to render a 3D VDR signal. An embodiment of the present invention may be implemented with a display that uses two views. Additionally or alternatively, an embodiment of the present invention may also be implemented with a display that uses more than two views (e.g., 3, 4, 5, or more views). For example, an embodiment may be implemented with an auto-stereoscopic display.

Figure 2:
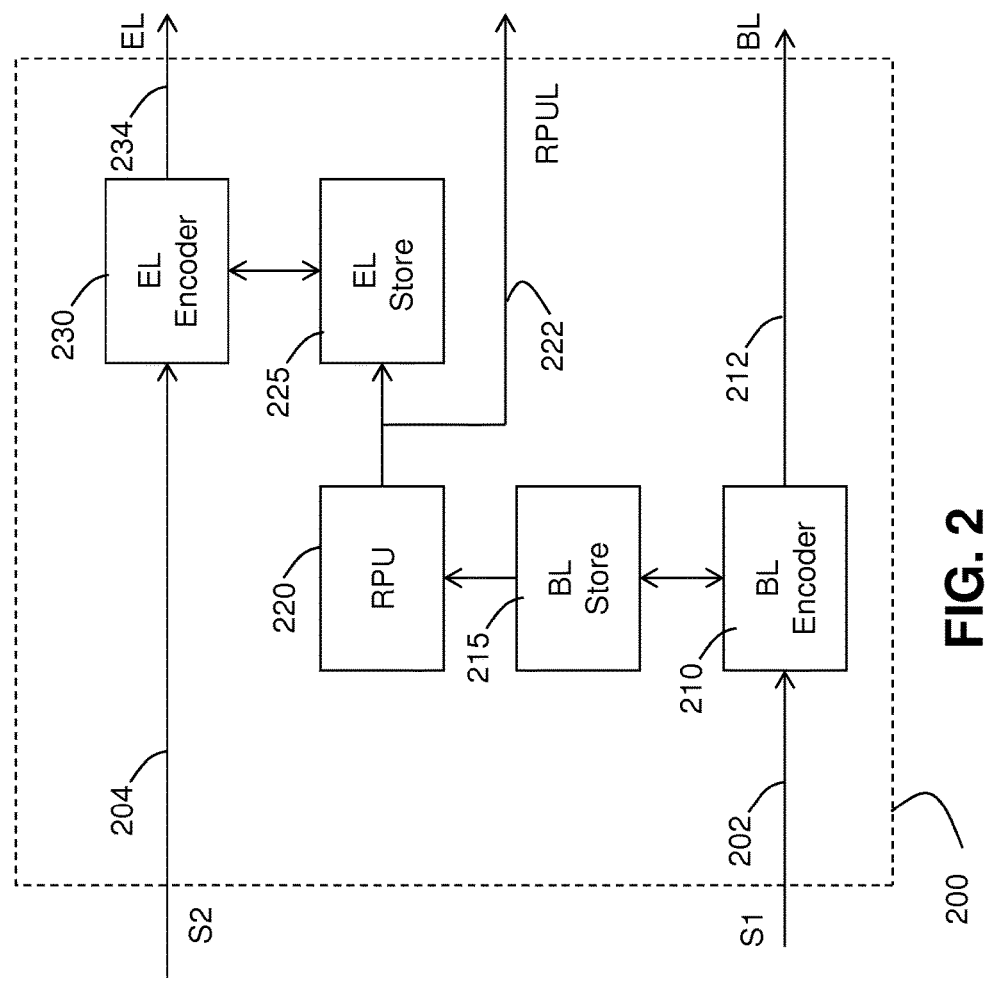
FIG. 2 depicts an example dual-view-dual-layer encoding module, according to an embodiment of the present invention.

Given two related video signals (e.g., S1 202 and S2 204), FIG. 2 depicts a block diagram of an embodiment of a dual-view-dual-layer (DVDL) encoder module for their efficient encoding using a base layer (BL), and an enhancement layer (EL). For example, in one embodiment, S1 may correspond to a view (e.g., a left view or a right view) of a 3D VDR signal and S2 may correspond to the same view of the corresponding SDR signal. In another embodiment, S1 may correspond to the first view of a 3D VDR or SDR signal and S2 may correspond to the second view of the same signal.

As depicted in FIG. 2, signal S1 202 is coded into a Base Layer (BL) 212 using BL encoder 210. BL encoder may be any of well-known video encoders, such as those defined by the MPEG-1, MPEG-2, or H.264 specifications. The output of the BL encoder may be also decoded (not shown), and output frames may be stored in the BL reference storage area 215. These frames may be post-processed by a reference processor unit (RPU) 220.

As used herein in relation to the RPU, the term "Reference" is not meant to imply or express, and should not be interpreted as meaning, that this picture is explicitly used as a reference within the complete coding process (e.g., in the sense of a "reference picture"). The RPU may conform to a description set forth in the following two patent application publications, filed pursuant to the Patent Cooperation Treaty (PCT), which are incorporated herein by reference for all purposes as if fully set forth herein: (1) WO 2010/123909 A1 by Tourapis, A., et al. for Directed Interpolation/Post-processing Methods for Video Encoded Data; and (2) WO 2011/005624 A1 by Tourapis, A., et al. for Encoding and Decoding Architecture for Frame Compatible 3D Video Delivery. The following descriptions of the RPU apply, unless otherwise specified to the contrary, both to the RPU of an encoder and to the RPU of a decoder. Artisans of ordinary skill in fields that relate to video coding will understand the differences, and will be capable of distinguishing between encoder-specific, decoder-specific and generic RPU descriptions, functions and processes upon reading of the present disclosure. Within the context of a 3D video coding system as depicted in FIG. 2, the RPU (220) accesses and interpolates decoded image S1 (202), according to a set of rules of selecting different RPU filters.

The RPU 220 enables the interpolation process to be adaptive at a region level, where each region of the picture/sequence is interpolated according to the characteristics of that region. RPU 220 can use horizontal, vertical, or two dimensional (2D) filters, edge adaptive or frequency based region-dependent filters, and/or pixel replication filters or other methods or means for interpolation.

For example, one pixel replication filter may simply perform a zero-order-hold, e.g., each sample in the interpolated image will be equal to the value of a neighboring sample in a low resolution image. Another pixel replication filter may perform a cross-view copy operation, e.g., each interpolated sample in one view, will be equal to the non-interpolated co-located sample from the opposing view.

Additionally or alternatively, a disparity-compensated copy scheme can also be used in the RPU. For example, the filter may copy a non-colocated region of samples where the location of the region to be copied, which may also be a region from a different view, can be specified using a disparity vector. The disparity vector may be specified using integer or sub-pixel accuracy and may involve simple, e.g. translational motion parameter, or more complex motion models such as affine or perspective motion information and/or others.

An encoder may select RPU filters and outputs regional processing signals, which are provided as input data to a decoder RPU. The signaling specifies the filtering method on a per-region basis. For example, parameters that relate to region attributes such as the number, size, shape and other characteristics are may be specified in an RPU related data header. Some of the filters may comprise fixed filter coefficients, in which case the filter coefficients need not be explicitly signaled by the RPU. Other filter modes may comprise explicit modes, in which the filter parameters, such as coefficient values and number of horizontal/vertical taps are signaled explicitly.

The filters may also be specified per each color component. The RPU may specify linear filters. Non-linear filters such as edge-adaptive filters, bi-lateral filters, etc., may also be specified in the RPU. Moreover, prediction models that specify advanced motion compensation methods such as the affine or perspective motion models may also be signaled.

The RPU data signaling can either be embedded in the encoded bitstream, or transmitted separately to the decoder. The RPU data may be signaled along with the layer on which the RPU processing is performed. Additionally or alternatively, the RPU data of all layers may be signaled within one RPU data packet, which is embedded in the bitstream either prior to or subsequent to embedding the layer 2 encoded data. The provision of RPU data may be optional for a given layer. In the event that RPU data is not available, a default scheme may thus be used for upconversion of that layer. Not dissimilarly, the provision of an enhancement layer encoded bitstream is also optional.

An embodiment allows for multiple possible methods of optimally selecting the filters and filtered regions in each RPU. A number of criteria may be used separately or in conjunction in determining the optimal RPU selection. The optimal RPU selection criteria may include the decoded quality of the base layer bitstream, the decoded quality of the enhancement layer bitstreams, the bit rate required for the encoding of each layer including the RPU data, and/or the complexity of decoding and RPU processing of the data.

An RPU may be optimized independent of subsequent processing in the enhancement layer. Thus, the optimal filter selection for an RPU may be determined such that the prediction error between the interpolated base layer images and the original left and right eye images is minimized, subject to other constraints such as bitrate and filter complexity.

The RPU 220 may serve as a pre-processing stage that processes information from BL encoder 210, before utilizing this information as a potential predictor for the enhancement layer in EL encoder 230. Information related to the RPU processing may be communicated (e.g., as metadata) to a decoder (e.g., 150) using an RPU Layer (RPUL) stream 222. RPU processing may comprise a variety of image processing operations, such as: color space transformations, non-linear quantization, luma and chroma up-sampling, filtering, or SDR to VDR mapping. In a typical implementation, the EL 234, BL 212, and RPUL 222 signals are multiplexed into a single coded bitstream (not shown).

Figure 3:
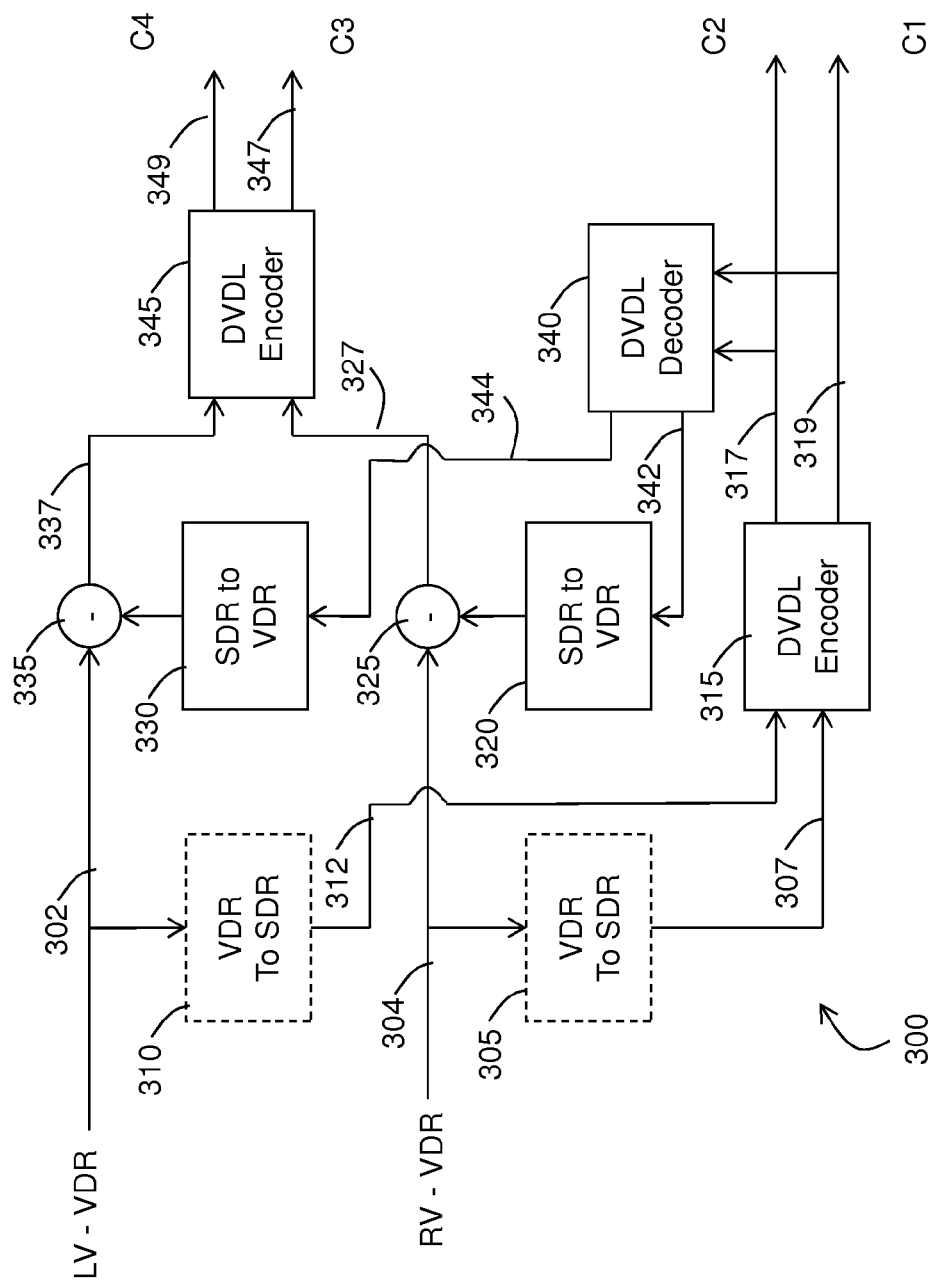
FIG. 3 depicts an example 3D VDR encoder, according to an embodiment of the present invention.

FIG. 3 depicts an example 3D VDR encoder according to an embodiment. Inputs to the encoding system 300 comprise a pair of VDR signals (302 and 304) and a pair of corresponding SDR signals (312 and 307). For example, LV-VDR 302 may represent the left view of an input VDR signal while RV-VDR 304 may represent the corresponding right view. SDR signals 312 and 307 may be generated via optional corresponding VDR to SDR tone mapping processors or through a color grading process (310 and 305).

DVDL encoder 315 (e.g., 300) receives two SDR inputs (307 and 312) and outputs signals C1 319 and C2 317. Signal C1 319 represents one view (e.g., the right view) of a baseline SDR signal. Signal C2 317 represents an enhancement layer to the C1 signal. Using C1 and C2, a DVDL Decoder module (e.g., 340 or 400) can reconstruct the second view of the input SDR signal (e.g., the left view). Thus, C1 319 and C2 317, combined, represent a coded baseline 3D SDR signal.

Signals C1 317 and C2 319 may be used as input to a DVDL decoder 340, which, as explained before, can be applied to reconstruct the two views of the input SDR signals (307 and 312) as they will be received by a corresponding decoder. In alternative embodiments, DVDL decoder may be removed and one may use the original SDR inputs; that is, signal 342 may be replaced by signal 307 and signal 344 may be replaced by signal 312. In yet another embodiment, signals 342 and 344 may be extracted directly from signals in the DVDL encoder 315. For example, signal 342 may be replaced by the output of the BL store unit (415) of DVDL encoder module 315.

SDR signals 342 and 344 are inputted to SDR to VDR predictors 320 and 330. Each of these predictors, given an SDR input (342 or 344), generates a prediction value for a corresponding VDR signal. These predictors may also generate additional metadata (not shown), which may be multiplexed as part of the multi-layer encoded bitstream that is transmitted to the decoder.

Encoding of 3D SDR signals 307 and 312 may comprise additional pre-processing steps, such as vertical or horizontal filtering of each view. In an embodiment, the two views of a 3D signal (e.g., 302 and 304 or 312 and 307) may be filtered by a horizontal low-pass filter before being horizontally-downsampled and then combined into a single side-by-side frame. Similarly, the same two views may be filtered by a low-pass vertical filter before being vertically-downsampled and combined into a single top-and-bottom frame. Then, instead of using the DVDL encoders (e.g., 315 and 345) to code directly the full-resolution views or full-resolution residuals, one may use DVDL encoders 315 and 345 to encode the sequence of generated top-and-bottom and side-by-side frames, and their corresponding residuals. These steps are not depicted in FIG. 3 in order to avoid unnecessarily occluding, obscuring, or obfuscating of the present invention.

Following the SDR to VDR predictions in 320 and 330, the predicted VDR views are subtracted from the original VDR views (302 and 304) to generate two VDR-residual signals 327 and 337. Thus, signal 337 may represent a left-view VDR residual signal and signal 327 may represent a right-view VDR residual signal. Those two signals may be inputted to a second DVDL encoder module 345 to generate output signals C3 347 and C4 349. Signals C3 and C4 represent a coded representation of a 3D residual VDR signal, which together with the baseline SDR C1 and C2 signals can fully reconstruct the input 3D VDR signal.

To improve coding efficiency of the VDR residual signals 327 and 337, each of those signals may be post-processed by a non-linear quantizer.

Signals C1, C2, C3, and C4, and all associated metadata (not shown) may be multiplexed into a single coded bitstream which can be transmitted to a receiver.

In some embodiments DVDL encoders 315 and 345 may be implemented using a multi-view (MVC) encoder, such as the one specified in Annex H of the H.264 specification. Similarly, DVDL decoder 340 may also comply with an MVC H.264 decoder.

In some embodiments, special VDR to SDR and SDR to VDR mapping algorithms may allow for almost identical reproductions of the predicted VDR signals. In such embodiments, residual signals 327 and 337 may be very small or close to zero. In those cases, DVDL encoder 345 may be eliminated and the SDR-to-VDR transformation parameters may be passed to a suitable decoder using metadata.

Because system 300 is based on processing a combination of legacy SDR signals and residuals that typically have a much lower dynamic range than the original VDR input, system 300 is amenable to cost-effective hardware implementation using existing commercially available SDR video encoders (e.g., MPEG encoding ICs with an 8-bit/pixel pipeline).

Image Decoding

Figure 4:
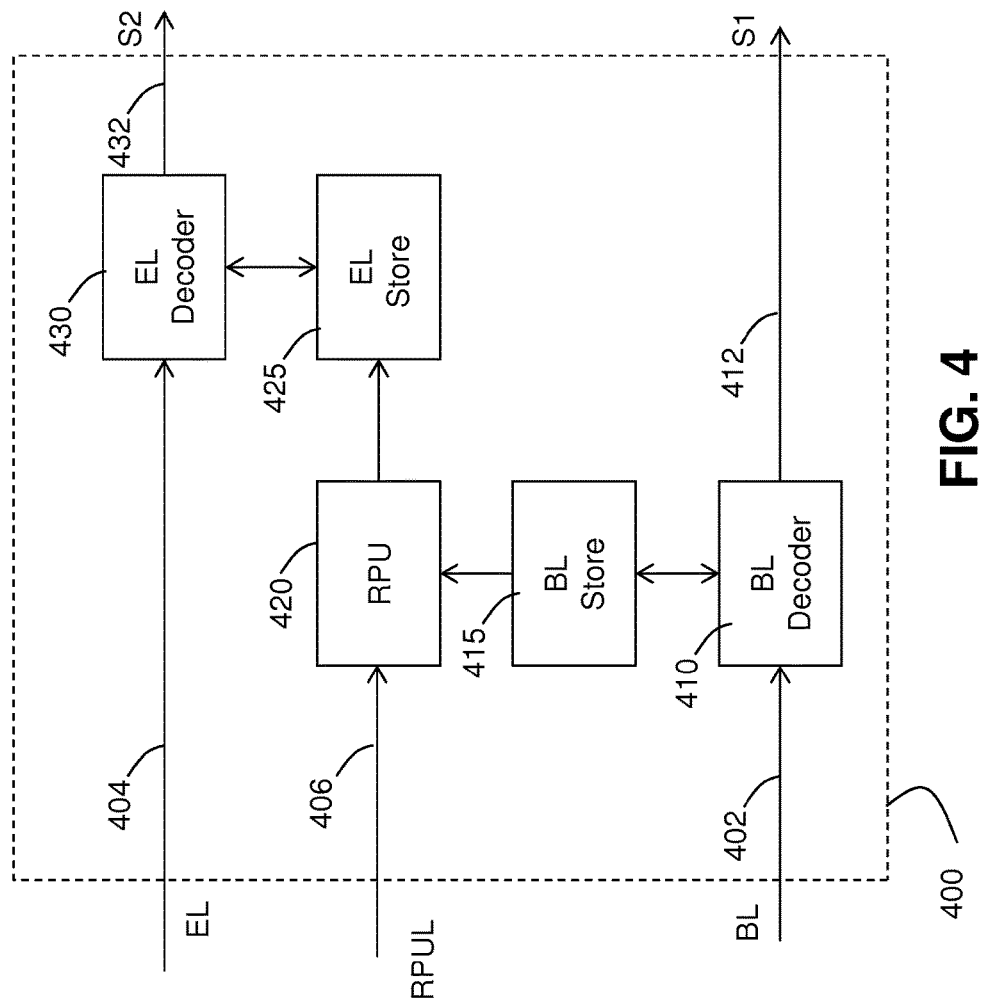
FIG. 4 depicts an example dual-view-dual-layer decoding module, according to an embodiment of the present invention.

FIG. 4 shows an example implementation of a DVDL decoder module (e.g. 340) according to an embodiment of this invention. Decoding module 400 receives a coded bitstream that may combine a base layer 402, an enhancement layer 404 and an RPU layer 406. The BL 402 may be decoded on its own using BL decoder 410 to generate a first signal S1 412. BL decoder 410 may be any decoder corresponding to the BL encoder 210 (e.g., an MPEG-2, MPEG-4, MPEG-4, or the like decoder). Frames from the BL decoder may also be stored in the reference BL store unit 415 so they can be used as reference frames in decoding the enhancement layer stream 404. Taking into consideration metadata stored in the RPUL 406, RPU 420 post-process data in the BL stores and outputs reference frames into the EL store unit 425. EL decoder 430, using reference frames from either the EL stream 404 or BL 402 generates output signal S2 432, which corresponds to a second signal, related to the first signal S1 412.

Figure 5:
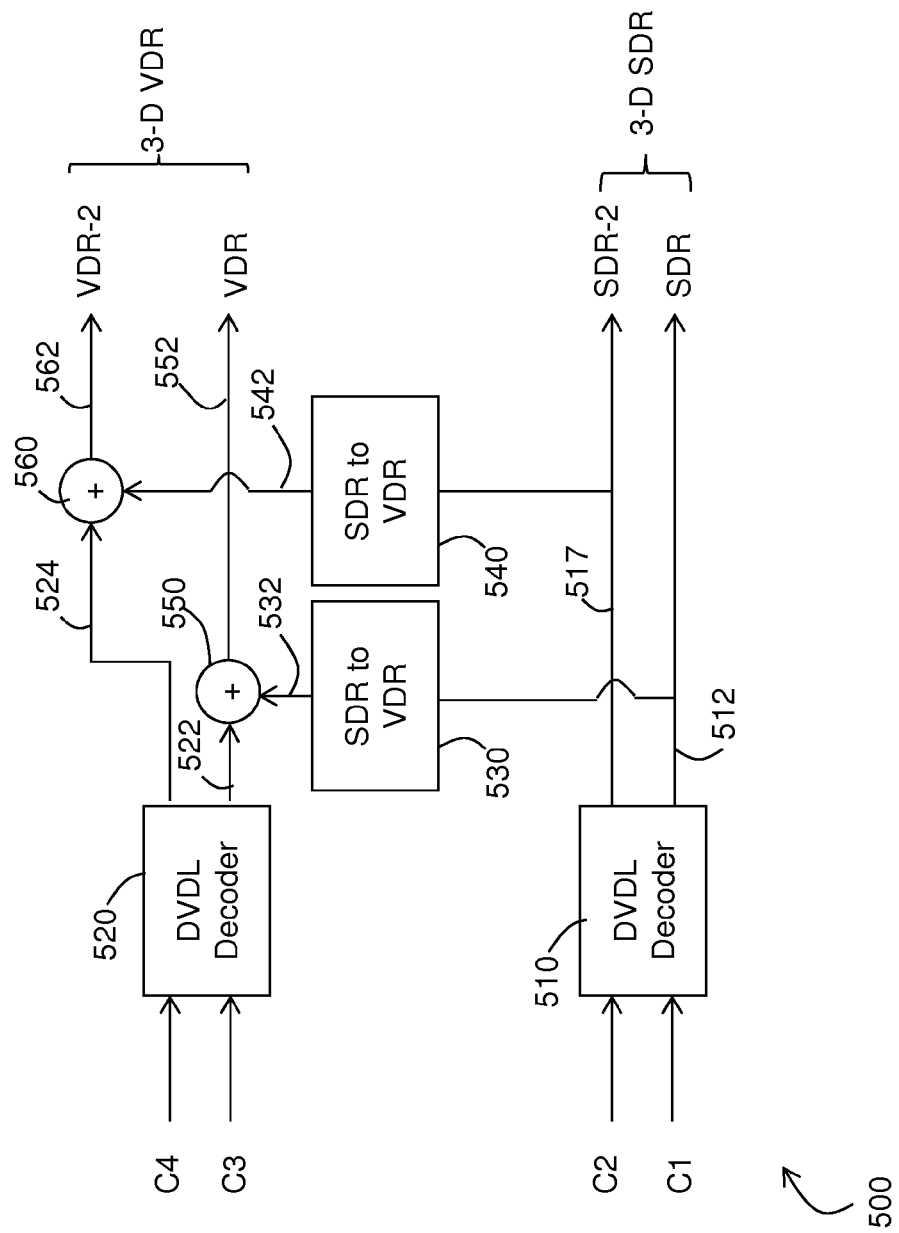
FIG. 5 depicts an example 3D VDR decoder, according to an embodiment of the present invention.

FIG. 5 depicts an example implementation of a 3D VDR decoder according to an embodiment. Decoder 500 receives a coded bitstream comprising of coded signals C1, C2, C3, C4, plus an optional RPU stream (not shown) comprising metadata related to the received coded bitstream. Signals C1 and C2 represent coded representations of a 3D SDR signal. Signals C3 and C4 represent coded representations of enhancement layers that can be used to recreate a 3D VDR signal.

DVDL decoder 510 (e.g., decoding module 400) may decode the C1 and C2 coded bitstreams to create a monoscopic SDR signal 512 and a second view of the SDR signal (SDR-2 517). Thus, legacy monoscopic SDR players can use signal SDR 512, while 3D SDR decoders may use both SDR and SDR-2 for 3D viewing.

For monoscopic (single view) VDR viewing, a VDR decoder may also comprise a second DVDL decoder 520 generating decoded VDR residual signals 522 and 524. Using SDR to VDR predictor 530, the decoder may generate predicted VDR signal 532, which when added to decoded residual 522 generates VDR signal 552.

For 3D VDR viewing, SDR to VDR predictor 540 may compute a second VDR predicted signal 542, which when added to the decoded residual 524 may generate a second view, signal VDR-2 562. Hence, a 3D display system may use VDR 552 and VDR-2 562 to display a 3D VDR rendering of the received signal.

To match corresponding processing on the encoder (e.g., 300), system 500 may also comprise additional components, such as horizontal and vertical filters for improved 3D processing, color transformation processors, or non-linear dequantizers.

Example HDR Display Implementation

Embodiments of the present invention can be implemented for an HDR display capable of rendering content with a DR that is higher than SDR. For example, an LCD displays with a backlight unit (BLU) that comprises a light emitting diode (LED) array can be used. The LEDs of the BLU array can be modulated separately from modulation of the polarization states of the active LCD elements. This dual modulation approach is extensible (e.g., to N-modulation layers wherein N comprises an integer greater than two), such as with controllable intervening layers between the BLU array and the LCD screen elements. Their LED array based BLUs and dual (or N-) modulation effectively increases the display referred DR of LCD monitors that have such features.

The color gamut that such an HDR display may render may also significantly exceed the color gamut of more conventional displays, even to the point of capably rendering a wide color gamut (WCG). Scene related HDR or VDR and WCG image content, such as may be generated by "next generation" movie and television cameras, may now be more faithfully and effectively displayed with HDR displays.

Alternatively, embodiments of the present invention can be implemented for an HDR display that is a projection system, for example, a dual projector system, such those described in U.S. Provisional Patent Application No. 61/476,949, which is incorporated herein for all purposes. In such a display, high peak luminance and increased dynamic range is provided by a main projector (projecting a base image) and a highlight projector (projecting a highlight image superimposed onto the base image). For 3D VDR, two dual projectors can be employed to provide four images: left perspective base image, right perspective base image, left highlight image, and right highlight image.

Example Computer System Implementation

Embodiments of the present invention may be implemented with a computer system, systems configured in electronic circuitry and components, an integrated circuit (IC) device such as a microcontroller, a field programmable gate array (FPGA), or another configurable or programmable logic device (PLD), a discrete time or digital signal processor (DSP), an application specific IC (ASIC), and/or apparatus that includes one or more of such systems, devices or components. The computer and/or IC may perform, control or execute instructions relating to 3D VDR encoding and decoding, such as those described herein. The computer and/or IC may compute any of a variety of parameters or values that relate to the 3D VDR encoding and decoding as described herein. The image and video dynamic range extension embodiments may be implemented in hardware, software, firmware and various combinations thereof.

Certain implementations of the invention comprise computer processors which execute software instructions which cause the processors to perform a method of the invention. For example, one or more processors in a display, an encoder, a set top box, a transcoder or the like may implement 3D VDR encoding and decoding methods as described above by executing software instructions in a program memory accessible to the processors. The invention may also be provided in the form of a program product. The program product may comprise any medium which carries a set of computer-readable signals comprising instructions which, when executed by a data processor, cause the data processor to execute a method of the invention. Program products according to the invention may be in any of a wide variety of forms. The program product may comprise, for example, physical media such as magnetic data storage media including floppy diskettes, hard disk drives, optical data storage media including CD ROMs, DVDs, electronic data storage media including ROMs, flash RAM, or the like. The computer-readable signals on the program product may optionally be compressed or encrypted.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (e.g., that is functionally equivalent), including components which are not structurally equivalent to the disclosed structure which performs the function in the illustrated example embodiments of the invention.

EQUIVALENTS, EXTENSIONS, ALTERNATIVES AND MISCELLANEOUS

Example embodiments that relate to encoding and decoding 3D VDR and SDR images are thus described. In the foregoing specification, embodiments of the present invention have been described with reference to numerous specific details that may vary from implementation to implementation. Thus, the sole and exclusive indicator of what is the invention, and is intended by the applicants to be the invention, is the set as recited in Claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for generating a multi-layer encoded video bitstream, wherein the multi-layer encoded video bitstream comprises a base layer and one or more enhancement layers, the method comprising:
   receiving a first 3D video signal having a first dynamic range, the first 3D video signal comprising a first view having the first dynamic range and a second view having the first dynamic range;
   generating, based at least in part on the first 3D video signal, a second 3D video signal having a second dynamic range, the second 3D video signal comprising a third view having the second dynamic range and a fourth view having the second dynamic range, wherein the first dynamic range is a higher dynamic range than the second dynamic range;
   encoding the third view and the fourth view using a first encoder to output a first coded video signal having the second dynamic range and a second coded video signal having the second dynamic range;
   generating a predicted 3D video signal having the first dynamic range based on interpolated decoded images of the second 3D video signal, wherein the predicted 3D video signal comprises a first predicted view having the first dynamic range and a second predicted view having the first dynamic range, wherein an interpolation process selects an optimal filter to minimize the prediction error between the first 3D video signal and the interpolated decoded images;
   generating a first residual signal having the first dynamic range based on the first view and the first predicted view;
   generating a second residual signal having the first dynamic range based on the second view and the second predicted view; and
   encoding the first residual signal and the second residual signal using a second encoder to output a first coded residual signal and a second coded residual signal;
   inserting the first coded video signal into the base layer of the multi-layer encoded video bitstream; and inserting the second coded video signal, the first coded residual signal, and the second coded residual signal into one or more of the enhancement layers of the multi-layer encoded video bitstream;

wherein the multi-layer encoded video bitstream is encoded in a multi-layer structure which (a) allows a monoscopic display device of the second dynamic range to retrieve single-view images of the second dynamic range from the multi-layer structure for displaying, (b) allows a stereoscope display device of the second dynamic range to retrieve both first-view and second-view images of the second dynamic range from the multi-layer structure for displaying, and (c) allows a stereoscopic display device of the first dynamic range to retrieve both first-view and second-view images of the first dynamic range from the multi-layer structure for displaying.

2. The method as recited in claim 1, wherein the second 3D video signal is derived from the 3D video signal having the first dynamic range using a mapping function from the first dynamic range to the second dynamic range.

3. The method as recited in claim 1, wherein generating the predicted 3D video signal comprises:

decoding the first coded video signal and the second coded video signal using a decoder to output a first decoded view having the second dynamic range and a second decoded view having the second dynamic range;

applying a first predictor from the second dynamic range to the first dynamic range to the first decoded view to generate the first predicted view; and applying a second predictor from the second dynamic range to the first dynamic range to the second decoded view to generate the second predicted view.

4. The method as recited in claim 1, wherein the first and/or second encoder comprises an H.264 multi-view encoder.

5. The method as recited in claim 1, wherein the steps of encoding comprise:

encoding a first video signal using a base layer encoder to generate a first resulting video signal;

generating a plurality of base layer reference frames based on the first resulting video signal;

generating a plurality of enhancement layer reference frames based on the plurality of base layer reference frames;

encoding a second video signal using an enhancement layer encoder to generate a second resulting video signal, wherein the enhancement layer encoder may use reference frames from both the second video signal or the plurality of enhancement layer frames;

wherein, if the encoding is performed by the first encoder, the first video signal represents the third view, the second video signal represents the fourth view, the first resulting video signal is the first coded video signal, and the second resulting video signal is the second coded video signal; and wherein, if the encoding is performed by the second encoder, the first video signal is the first residual signal, the second video signal is the second residual signal, the first resulting video signal is the first coded residual signal, and the second resulting video signal is the second coded residual signal.

6. The method as recited in claim 5, wherein generating the plurality of enhancement layer reference frames based on the plurality of base layer reference frames comprises using a reference processing unit to process information from the base layer encoder before utilizing this information as a potential predictor for the enhancement layer in the enhancement layer encoder (230), and wherein the information related to the processing by the reference processing unit is inserted as metadata into the multi-layer encoded video bitstream.

7. An apparatus comprising a processor and configured to perform the method recited in claim 1.

8. A non-transitory computer-readable storage medium having stored thereon computer-executable instructions for executing a method in accordance with claim 1.

9. The method as recited in claim 1, wherein the first view and the second view represent a pair of left and right views, and wherein the third view and the fourth view represent a second pair of left and right views.

10. A method for decoding a coded 3D video signal having a first dynamic range, the method comprising, for a first coded video signal having a second dynamic range, wherein the first coded video signal represents a base layer of the coded 3D video signal, and wherein the first dynamic range is a higher dynamic range than the second dynamic range, and for a second coded video signal having the second dynamic range, a first coded residual signal, and a second coded residual signal representing one or more enhancement layers of the coded 3D video signal:

decoding the first coded video signal and the second coded video signal using a first decoder to generate a first view video signal having the second dynamic range and a second view video signal having the second dynamic range;

generating a first view base layer video signal having the first dynamic range based on the first view video signal;

generating a second view base layer video signal having the first dynamic range based on the second view video signal;

decoding the first coded residual signal and the second coded residual signal using a second decoder to generate a first view residual signal having the first dynamic range and a second view residual signal having the first dynamic range;

wherein the first coded residual signal is generated by a video encoder based in part on a first predicted view in a predicted 3D video signal having the first dynamic range, wherein the second coded residual signal is generated by the video encoder based in part on a second predicted view in the predicted 3D video signal having the first dynamic range;

wherein the predicted 3D video signal having the first dynamic range is generated by the video encoder based on interpolated decoded images of a second 3D video signal having the second dynamic range, wherein an interpolation process in the video encoder selects an optimal filter to minimize the prediction error between a first 3D video signal having the first dynamic range and the interpolated decoded images;

generating a third view video signal having the first dynamic range based on the first view residual signal and the first view base layer video signal; and generating a fourth view video signal having the first dynamic range based on the second view residual signal and the second view base layer video signal;

wherein the first coded video signal and the second coded video signal are encoded in a multi-layer encoded video bitstream is encoded in a multi-layer structure which (a) allows a monoscopic display device of the second dynamic range to retrieve single-view images of the second dynamic range from the multi-layer structure for displaying, (b) allows a stereoscope display device of the second dynamic range to retrieve both first-view and second-view images of the second dynamic range from the multi-layer structure for displaying, and (c) allows a stereoscopic display device of the first dynamic range to retrieve both first-view and second-view images of the first dynamic range from the multi-layer structure for displaying.

11. A decoder adapted for performing the method as recited in claim 10.

12. A system for generating a multi-layer encoded video bitstream, wherein the multi-layer encoded video bitstream comprises a base layer and one or more enhancement layers, the system comprising:
one or more computing processors;
one or more non-transitory computer-readable storage media having stored thereon computer-executable instructions which when executed by the one or more computing processors, cause the one or more computing processors to perform:
receiving a first 3D video signal having a first dynamic range, the first 3D video signal comprising a first view having the first dynamic range and a second view having the first dynamic range;
generating, based at least in part on the first 3D video signal, a second 3D video signal having a second dynamic range, the second 3D video signal comprising a third view having the second dynamic range and a fourth view having the second dynamic range, wherein the first dynamic range is a higher dynamic range than the second dynamic range;
encoding the third view and the fourth view using a first encoder to output a first coded video signal having the second dynamic range and a second coded video signal having the second dynamic range;
generating a predicted 3D video signal having the first dynamic range based on interpolated decoded images of the second 3D video signal, wherein the predicted 3D video signal comprises a first predicted view having the first dynamic range and a second predicted view having the first dynamic range, wherein an interpolation process selects an optimal filter to minimize the prediction error between the first 3D video signal and the interpolated decoded images;
generating a first residual signal having the first dynamic range based on the first view and the first predicted view;
generating a second residual signal having the first dynamic range based on the second view and the second predicted view; and
encoding the first residual signal and the second residual signal using a second encoder to output a first coded residual signal and a second coded residual signal;
inserting the first coded video signal into the base layer of the multi-layer encoded video bitstream; and
inserting the second coded video signal, the first coded residual signal, and the second coded residual signal into one or more of the enhancement layers of the multi-layer encoded video bitstream;
wherein the multi-layer encoded video bitstream is encoded in a multi-layer structure which (a) allows a monoscopic display device of the second dynamic range to retrieve single-view images of the second dynamic range from the multi-layer structure for displaying, (b) allows a stereoscope display device of the second dynamic range to retrieve both first-view and second-view images of the second dynamic range from the multi-layer structure for displaying, and (c) allows a stereoscopic display device of the first dynamic range to retrieve both first-view and second-view images of the first dynamic range from the multi-layer structure for displaying.

13. The system as recited in claim 12, wherein the second 3D video signal is derived from the 3D video signal having the first dynamic range using a mapping function from the first dynamic range to the second dynamic range.

14. A decoding system for decoding a coded 3D video signal having a first dynamic range, the decoding system comprising, for a first coded video signal having a second dynamic range, wherein the first coded video signal represents a base layer of the coded 3D video signal, and wherein the first dynamic range is a higher dynamic range than the second dynamic range, and for a second coded video signal having the second dynamic range, a first coded residual signal, and a second coded residual signal representing one or more enhancement layers of the coded 3D video signal:
one or more computing processors;
one or more non-transitory computer-readable storage media having stored thereon computer-executable instructions which when executed by the one or more computing processors, cause the one or more computing processors to perform:
decoding the first coded video signal and the second coded video signal using a first decoder to generate a first view video signal having the second dynamic range and a second view SDR video signal having the second dynamic range;
generating a first view base layer video signal having the first dynamic range based on the first view video signal;
generating a second view base layer video signal having the first dynamic range based on the second view video signal;
decoding the first coded residual signal and the second coded residual signal using a second decoder to generate a first view residual signal having the first dynamic range and a second view residual signal having the first dynamic range;
wherein the first coded residual signal is generated by a video encoder based in part on a first predicted view in a predicted 3D video signal having the first dynamic range, wherein the second coded residual signal is generated by the video encoder based in part on a second predicted view in the predicted 3D video signal having the first dynamic range;
wherein the predicted 3D video signal having the first dynamic range is generated by the video encoder based on interpolated decoded images of a second 3D video signal having the second dynamic range, wherein an interpolation process in the video encoder selects an optimal filter to minimize the prediction error between a first 3D video signal having the first dynamic range and the interpolated decoded images;
generating a third view video signal having the first dynamic range based on the first view residual signal and the first view base layer video signal; and
generating a fourth view video signal having the first dynamic range based on the second view residual signal and the second view base layer video signal;
wherein the first coded video signal and the second coded video signal are encoded in a multi-layer encoded video bitstream is encoded in a multi-layer structure which (a) allows a monoscopic display device of the second dynamic range to retrieve single-view images of the second dynamic range from the multi-layer structure for displaying, (b) allows a stereoscope display device of the second dynamic range to retrieve both first-view and second-view images of the second dynamic range from the multi-layer structure for displaying, and (c) allows a stereoscopic display device of the first dynamic range to retrieve both first-view and second-view images of the first dynamic range from the multi-layer structure for displaying.

* * * * *